United States Patent [19]

Godbe

[11] 4,233,730

[45] Nov. 18, 1980

[54] BOILER TUBE PULLING METHOD AND APPARATUS

[76] Inventor: James R. Godbe, P.O. Box 35429, Dallas, Tex. 75235

[21] Appl. No.: 929,279

[22] Filed: Jul. 31, 1978

[51] Int. Cl.$^{3}$ .............................................. B23P 15/26

[52] U.S. Cl. ......................................... 29/727; 29/280; 29/283; 29/283.5; 29/157.4; 269/249

[58] Field of Search ............... 269/249, 250, 251, 252; 29/282, 283, 280, 727, 157.4

[56] References Cited

U.S. PATENT DOCUMENTS

| | | | |
|---|---|---|---|
| 747,433 | 12/1903 | Jacobson | 269/249 |
| 1,774,878 | 9/1930 | Fitzpatrick | 269/249 X |
| 1,794,976 | 3/1931 | Mueller | 269/249 X |
| 2,385,000 | 9/1945 | Hoke | 29/283 |
| 2,507,201 | 5/1950 | Evans | 30/91 |
| 2,744,429 | 5/1956 | Seely | 81/15 |
| 3,040,421 | 6/1962 | Race | 29/282 X |
| 3,104,461 | 9/1963 | Nieglos | 29/282 |
| 3,245,247 | 4/1966 | Valente | 72/402 |

FOREIGN PATENT DOCUMENTS

| | | | |
|---|---|---|---|
| 14523 | of 1890 | United Kingdom | 269/249 |
| 5698 | of 1904 | United Kingdom | 269/249 |
| 305322 | 7/1971 | U.S.S.R. | 29/282 |

*Primary Examiner*—Francis S. Husar
*Assistant Examiner*—V. K. Rising
*Attorney, Agent, or Firm*—Hubbard, Thurman, Turner, Tucker & Glaser

[57] ABSTRACT

A boiler tube crimping tool and method of use for breaking the seal between a boiler tube and tube sheet to facilitate the pulling of the boiler tube from the tube sheet. The preferred method includes cutting the boiler tube, then crimping the remaining tube stub, followed by pushing the tube stub from the tube sheet.

6 Claims, 6 Drawing Figures

BOILER TUBE PULLING METHOD AND APPARATUS

BACKGROUND OF THE INVENTION

This invention relates to a method and apparatus for pulling boiler tubes from tube sheets and more particularly to the apparatus for breaking the seal between a boiler tube and a tube sheet.

Prior art believed to be relevant to the present invention includes: U.S. Pat. No. 2,507,201 issued to Evans on May 9, 1950; U.S. Pat. No. 2,744,429 issued to Seely on May 8, 1956; and, U.S. Pat. No. 3,245,247 issued to Valente on Apr. 12, 1966.

The Evans patent discloses the various problems involved in removing tubes from tube sheets and provides a one-piece cutter or plow-type tool for slitting the tubes from the outside of the tube sheet to thereby break the bond between the tube and the tube sheet.

The Seely patent teaches a particular type of tube crimper used in reducing the cross-section of a capillary tube to provide a precise flow resistance.

The Valente patent teaches a complicated device for pointing the end of tubing so that the tubing may be inserted into a drawing die.

Another method often used for removing tubing from tube sheets is by use of a cutting torch. This is particularly common in the case of large boilers using heavy walled tubing on the order of three inches in diameter. Errors in use of the cutting torch can, of course, damage the tube sheet requiring expensive refinishing and repair work. With such heavy walled tubing, the use of a cutter tool as taught by Evans is not practical.

Thus it is seen that there is a need for a simple method of removing tubing, especially heavy-walled tubing from tube sheets without damaging the tube sheet bonding surfaces.

SUMMARY OF THE INVENTION

Accordingly, an object of the present invention is to provide a simplified method and apparatus for removing tubing from tube sheets without damaging the tube sheet bonding surfaces.

According to the present invention, a simple tube crimping tool is provided for crimping tubing near a tube sheet and a preferred method includes crimping the tubing at at least three spaced points on its circumference whereby the tube diameter is reduced sufficiently at the tube sheet so that the tube-to-sheet bond is at least partially broken and the tube may be removed from the tube sheet easily.

DESCRIPTION OF THE DRAWINGS

The present invention may be more fully understood by reading the following description of the preferred embodiments with reference to the accompanying drawings wherein.

DESCRIPTION OF THE PREFERRED EMBODIMENT

Figure 1:
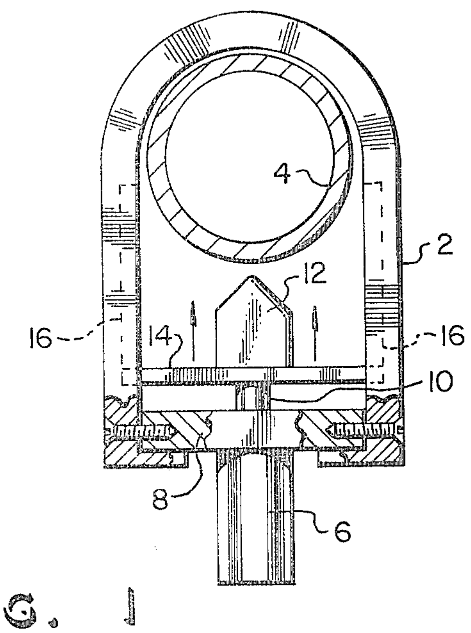
FIG. 1 is an illustration of a tubing crimper according to the present invention in position on a boiler tube prior to a crimping operation.

With reference to FIG. 1, there is illustrated a device which has been successfully used for removing heavy-walled boiler tubes from tube sheets. This tool has a U-shaped frame or collar 2 shown positioned around a section of heavy-walled tubing 4. The curved portion of collar 2 has a diameter which is slightly larger than the outer diameter of tubing 4. A hydraulic jack cylinder 6 is threaded into a plate 8 which bridges the legs of the U-shaped collar 2 and is bolted thereto. The hydraulic jack 6 has a piston 10 which drives a ram or crimping wedge 12 in the direction of tubing 4. A guide plate 14 is connected to ram 12 and fits within slots 16 in collar 2. When hydraulic fluid is applied to jack 6, from a source that is not illustrated, the ram 12 moves toward tubing 4 to contact it and deform or crimp the tubing. The close fit of collar 2 around the outer walls of the tube to be removed from the tube sheet prevents tubing 4 from simply flattening out and increasing its diameter at any point. Thus while a U-shaped member is used to engage the tube in this preferred form, any member having an inner concave surface conforming to the tube over about half of its circumference may be used. Such a tube-engaging member provides the reaction force for the driving means and prevents the tube from expanding beyond original diameter.

Figure 2:
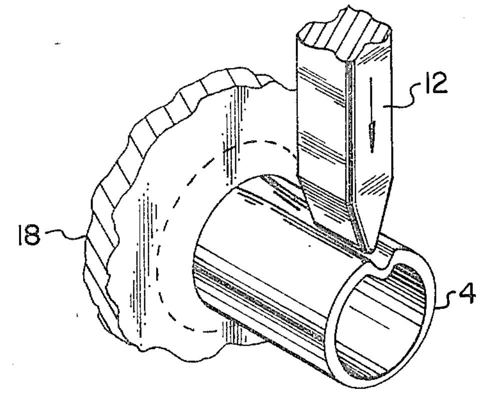
FIGS. 2, 3 and 4 illustrate various views of the crimping operation.
Figure 3:
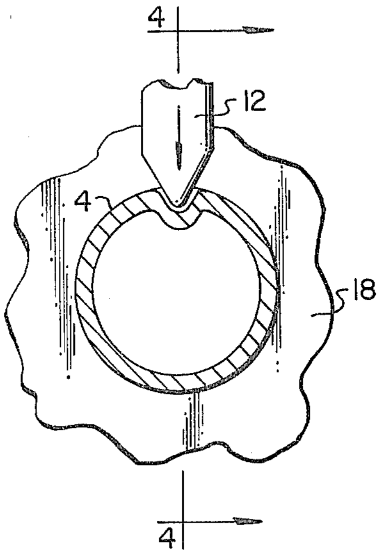
Figure 4:
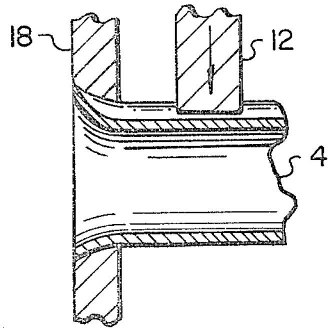

With reference now to FIGS. 2, 3 and 4, the operation of the tool illustrated in FIG. 1 will be explained. With reference to these figures, the tubing 4 is sealed to a tube sheet 18, having been rolled into the tube sheet hole which is typically tapered. The taper is exaggerated in the drawings for purposes of illustration. As the hydraulic jack is activated, the ram is brought into contact with the tubing 4 as close as possible to the back of the tube sheet to crimp the tube along a line parallel to the tube axis. As the crimping operation proceeds, the effect of the crimp carries down the tube into the region of the tube sheet bonding area and thereby breaks the bond between the tube and the tube sheet.

Figure 5:
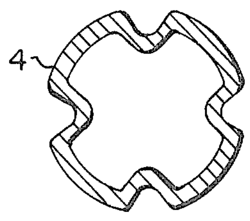
FIG. 5 illustrates the form of tubing after a completed crimping operation; and, FIG. 6 illustrates two improvements to the tool illustrated in FIG. 1.

With reference to FIG. 5, there is shown a preferred final crimping form in which the tube 4 has been crimped at four points on its circumference by successive rotation of the crimping tool illustrated in FIG. 1. This arrangement has been found very effective in practice in breaking the bond and allowing easy removal of the tube.

In FIGS. 2 through 4, only a short stub of the tube 4 is illustrated. The illustration of the short stub is intentional since the preferred method of removing the tube includes the cutting of the tube with a cutting torch or by some other suitable means, a short distance from the tube sheet. The use of the cutting torch at a distance from the tube sheet causes no damage to the tube sheet bonding surface. The tool illustrated in FIG. 1 may then be easily slipped over the remaining tube stub for performing the crimping operation to break the bond between the tube and the tube sheet. After the tube has been crimped as illustrated in FIG. 5, it is a simple matter to push the stub through the tube sheet.

The present invention is not intended to be limited to a method requiring that boiler tubes be cut before the crimping operation. The cutting is preferred since in practice it has been found to be a fast and efficient overall method of removing the tube. The tool illustrated in FIG. 1 may be modified so that the jack 6 and ram 12 assembly may be easily removed from the collar 2. This can be done, for example, by cutting appropriate slots in collar 2 allowing the jack and ram assembly to slide sideways away from collar 2. This would facilitate the use of the tool on tubes which have not been cut.

Figure 6:
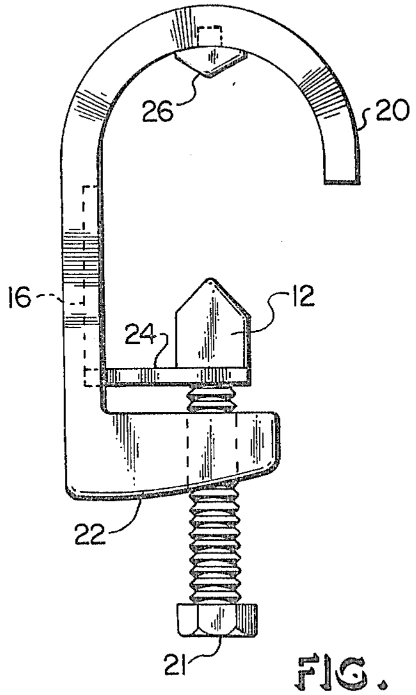

FIG. 6 illustrates several contemplated modifications including one which would simplify the use of the tool on tubing which has not been cut. In FIG. 6, the U-shaped collar has been replaced by a J-shaped collar 20. The jack 6 has been replaced with a purely mechanical driving means in the form of a screw 21 which drives the crimping ram 12 which is otherwise identical to that illustrated in FIG. 1. The plate 8 illustrated in FIG. 1 has been replaced by a heavy cantilever arm 22 connected to the long arm of the J-collar 20. Arm 22 is threaded to receive the screw 21. It is apparent that the cantilever arm 22 must be extremely strong to avoid deformation in its intended use. A guide rail 24 is also provided for ram 12 and rides in a single slot 16 in the long arm of J-collar 20 to prevent rotation of ram 12.

A second improvement illustrated in FIG. 6 is a second wedge or ram 26 mounted in the center of the curved portion of J-collar 20. By the addition of this second ram, it should be possible to provide two crimps in tubing 4 for each operation of screw 21. This second ram may, of course, be used with the U-shaped collar illustrated in FIG. 1 also. The use of the second crimping ram 22 would require that the arms of U-shaped collar 2 or the J-shaped collar 20 be made sufficiently long to prevent expansion of tubing 4 during the crimping operation.

Normally it is desirable to form at least two crimps in the walls of the tube to be removed from the tube sheet in order to break the seal between the tubes and the tube sheets. Preferably, especially when thick walled tubes are removed, four crimps are utilized for breaking the seal between the outer walls of the tube and the aperture extending through the tube sheet. It will be appreciated that there may be instances where it will be desirable to utilize more than four crimps when the apparatus and method of this invention are utilized to extract thick walled tubes from tube sheets.

Since a four-crimp operation as illustrated in FIG. 5 is preferred, the angle of the point of ram 12 should be 90° or less. The contact edge need not be extremely sharp since it is not desired to cut tube 4, and this would, in fact, reduce the effectiveness of the crimping operation.

While the foregoing description has been directed to the removal of boiler tubes from tube sheets, it will be appreciated that the method and apparatus of this invention are useful for removing tubular members from waste heat boilers, waste heat drums, steam chests, heat exchangers and the like where tubular members extend into or through apertures in various walls and are sealed in place by expanding the tubular members outwardly to contact the walls of such apertures.

It will also be appreciated that a variety of different sized tools of the present invention will normally be used to extract tubes of different sizes. As previously mentioned, the curved inner surface of the collar pieces of the tools are preferably the same size or only slightly larger in diameter than the outside diameter of the tubes to be extracted. Such sizing lessens the tendency of the tubes to flatten when pressure is exerted by the ram.

While the present invention has been shown and illustrated in terms of specific apparatus and methods, it is apparent that other changes and modifications may be made within the scope of the present invention as defined by the appended claims.

I claim:

1. Apparatus for breaking the bond between a tube and a tube sheet comprising:
   - a substantially rigid tube engaging member having a concave surface conforming to substantially half the circumference of a tube,
   - driving means attached to said tube engaging member, and
   - a crimping wedge attached to the driving means and positioned opposite of said concave surface to be driven toward said concave surface by said driving means.

2. Apparatus according to claim 1 wherein said tube engaging member is a U-shaped member and said driving means is connected to the legs of said U-shaped member.

3. Apparatus according to claim 1 wherein said tube engaging member is a J-shaped member and said driving means is attached to the long leg of the J-shaped member.

4. Apparatus according to claim 1 or claim 2 or claim 3 wherein said driving means comprises a hydraulic cylinder.

5. Apparatus according to claim 1 or claim 2 or claim 3 wherein said driving means comprises a mechanical screw.

6. Apparatus according to claim 1 or claim 2 or claim 3 further including a second wedge attached to said concave surface, directly opposed to the crimping wedge attached to the driving means.

* * * * *